United States Patent
Bouillet et al.

(10) Patent No.: US 10,832,583 B2
(45) Date of Patent: Nov. 10, 2020

(54) TARGETED LEARNING AND RECRUITMENT

(71) Applicant: INTERNATIONAL BUSINESS MACHINES CORPORATION, Armonk, NY (US)

(72) Inventors: Eric P. Bouillet, Dublin (IE); Francesco Calabrese, Dublin (IE); Bissan Ghaddar, Dublin (IE); Alessandra Pascale, Dublin (IE); Martin J. Stephenson, Ballynacargy (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 15/273,786

(22) Filed: Sep. 23, 2016

(65) Prior Publication Data
US 2018/0090022 A1 Mar. 29, 2018

(51) Int. Cl.
G09B 5/12 (2006.01)
G06Q 50/20 (2012.01)
G09B 7/00 (2006.01)
G06Q 10/06 (2012.01)

(52) U.S. Cl.
CPC .......... *G09B 5/12* (2013.01); *G06Q 10/0631* (2013.01); *G06Q 50/2057* (2013.01); *G09B 7/00* (2013.01)

(58) Field of Classification Search
CPC .............................. G09B 5/12; G06Q 50/2057
See application file for complete search history.

(56) References Cited

U.S. PATENT DOCUMENTS

| | | | | |
|---|---|---|---|---|
| 8,175,511 | B1* | 5/2012 | Sordo | G09B 7/00 434/118 |
| 2007/0122790 | A1* | 5/2007 | Sperle | G09B 5/00 434/350 |
| 2009/0035733 | A1* | 2/2009 | Meitar | G09B 7/00 434/118 |
| 2010/0233663 | A1 | 9/2010 | Pennington et al. | |
| 2010/0306016 | A1 | 12/2010 | Solaro et al. | |
| 2011/0065082 | A1* | 3/2011 | Gal | G09B 7/02 434/365 |
| 2012/0215578 | A1 | 8/2012 | Swierz, III et al. | |
| 2013/0004930 | A1* | 1/2013 | Sorenson | G09B 7/02 434/350 |

(Continued)

FOREIGN PATENT DOCUMENTS

| | | |
|---|---|---|
| CN | 104899195 A | 9/2015 |
| KR | 20150053317 | 5/2015 |

OTHER PUBLICATIONS

Garcia-Sanchez et al., "An ontology-based intelligent system for recruitment," Expert Systems with Applications, 31, 2006 (16 pages).

(Continued)

*Primary Examiner* — James B Hull
(74) *Attorney, Agent, or Firm* — Griffiths & Seaton PLLC

(57) ABSTRACT

Embodiments for targeted learning and recruitment by a processor. Attributes obtained from a user profile are used to identify a user as a potential candidate for performing an activity related to either the recruiting or the learning and providing a customized learning experience with targeted course suggestions for the user.

7 Claims, 6 Drawing Sheets

(56) References Cited

U.S. PATENT DOCUMENTS

| | | | | |
|---|---|---|---|---|
| 2014/0188574 A1* | 7/2014 | Luca | ................ | G09B 7/00 |
| | | | | 705/7.39 |
| 2014/0227673 A1* | 8/2014 | Yousef | ................ | G09B 5/00 |
| | | | | 434/350 |
| 2014/0337223 A1* | 11/2014 | Kapoor | ................ | G09B 5/00 |
| | | | | 705/44 |
| 2014/0377723 A1* | 12/2014 | Strong | ................ | G09B 19/0053 |
| | | | | 434/118 |
| 2015/0120593 A1 | 4/2015 | Madhavan et al. | | |
| 2017/0344555 A1* | 11/2017 | Yan | ................ | G06F 17/3053 |

OTHER PUBLICATIONS

IBM, "Improved Method and System for Managing Workflow Tasks," An IP.com Prior Art Database Technical Disclosure, IP.com No. IPCOM000184057D, Jun. 9, 2009 (7 pages).

* cited by examiner

TARGETED LEARNING AND RECRUITMENT

BACKGROUND OF THE INVENTION

Field of the Invention

The present invention relates in general to computing systems, and more particularly to, various embodiments for targeted learning and recruitment using a computing processor.

Description of the Related Art

Computing systems may be found in the workplace, at home, or at school. Due to the recent advancement of information technology and the growing popularity of the Internet, a wide variety of computer-based systems have entered the job-search, recruiting, and educational arena. For example, computer systems may be used to assist with recruiting and training to help the success of an individual or organization. Computer systems may also be used for learning and educating a user. Such training and education may also help users remain knowledgeable and current in areas of expertise of the organization. Through the technology of computers and the Internet, job searchers and employers are finding it easier to fulfill coincident needs.

SUMMARY OF THE INVENTION

Various embodiments for targeted learning and recruitment by a processor, are provided. In one embodiment, by way of example only, a method for targeted learning and recruitment, again by a processor, is provided. Attributes obtained from a user profile may be used to identify a user as a potential candidate for performing an activity related to either the recruiting or the learning and providing a customized learning experience with targeted course suggestions for the user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
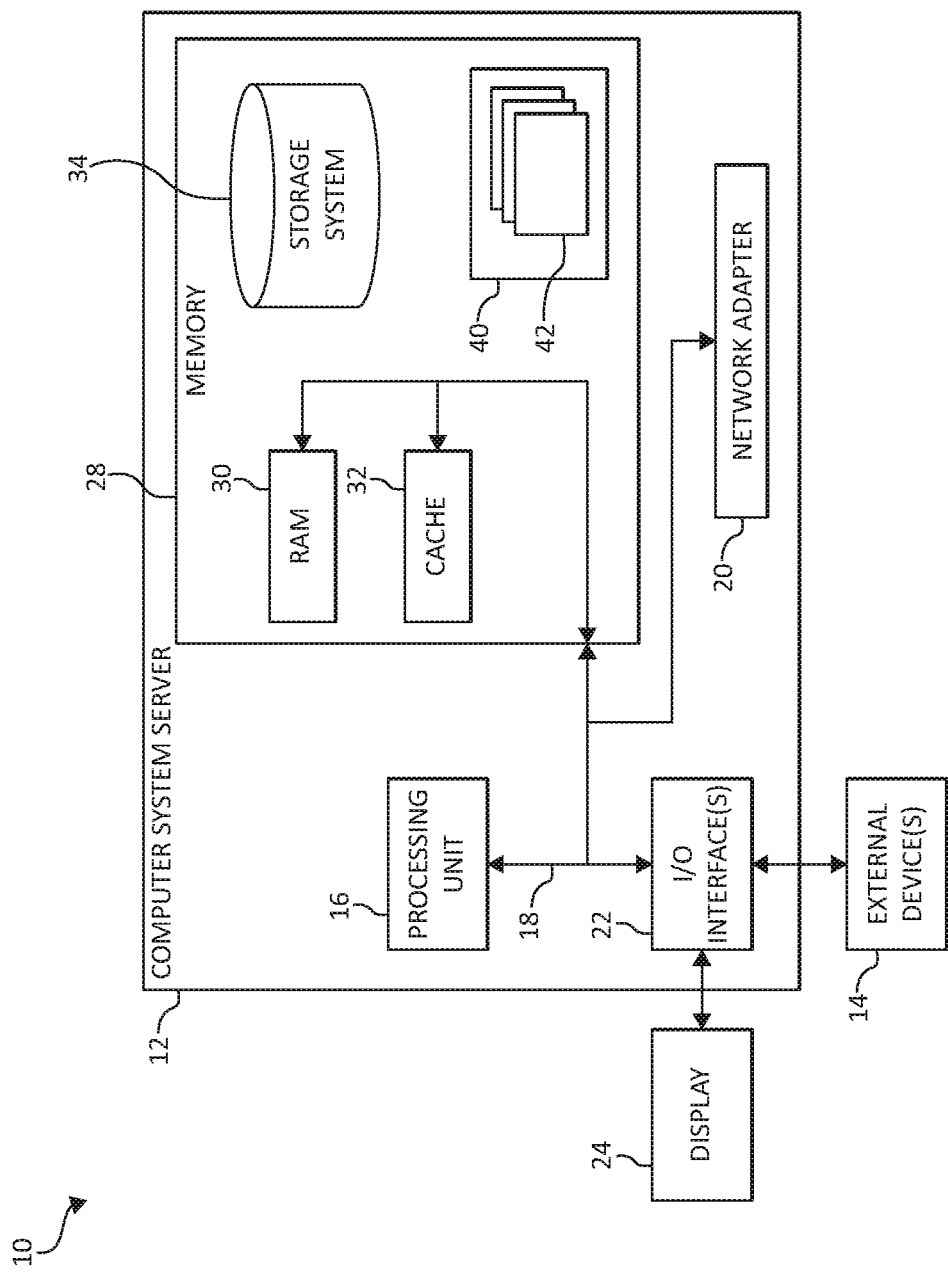
FIG. 1 is a block diagram depicting an exemplary cloud computing node according to an embodiment of the present invention.

Various businesses, educational institutions, and other organizations are constantly looking for new tools to help them teach, train, and educate more efficiently and effectively. For example, web-based learning management systems (LMS) and content management systems (CMS) have been increasingly used by corporations, government agencies, and higher education institutions. A LMS is a software package that facilitates the management and delivery of online content to learners, often in order to enable the individualized and flexible access to learning content.

In one aspect, users learning experience with these various computing resources may be recorded. However, most of the recorded information is not sharable and is proprietary. For example, although related educational or training scores may be shared, a cognitive profile of the user in the sense of how did they learn or acquire a given course or skill, what resources or persons were used, what assistance was provided to learn the given course or skill (e.g., team projects, team effort, educational applications such as the LMS) are not shared. Because the information is privately safeguarded and not shared, it is difficult to correlate what a person learned, how this information was used in practice, such as when transitioning from learning environment to professional environment, which is often times a more accurate measure of how qualified a person is in relation to a particular skill or task. Even if the user profile or learning experience information is available, currently this information cannot be measured for comparison purposes as it is generated from different tools and entities using various degrees and scales of assessment.

Accordingly, the present invention provides for a targeted recommendation and recruitment system for customized education, training, and task assignment. The mechanisms of the illustrated embodiments adaptively build and maintain open, portable and sharable user profiles containing learned knowledge, learning paths, and cognitive qualities that can be inferred from learning paths (e.g., a most efficient delivery means and method, a best time of day according to a user preference or interest, rest times, and the like). In one aspect, a user from a pool of candidates may be identified according to attributes of the sharable user profile that more closely matches a particular job, course (e.g., training or educational), and/or task as compared to other user profiles. For example, in one aspect, the most closely matching or most qualified user profile(s) may indicate a matching score that ranks higher than other user profiles in the pool of candidates. A customized learning experience and one or more course suggestions may be provided to a selected user or a group of users (including students, groups, employees, teams, etc.) based on each of the selected users or a group of users.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
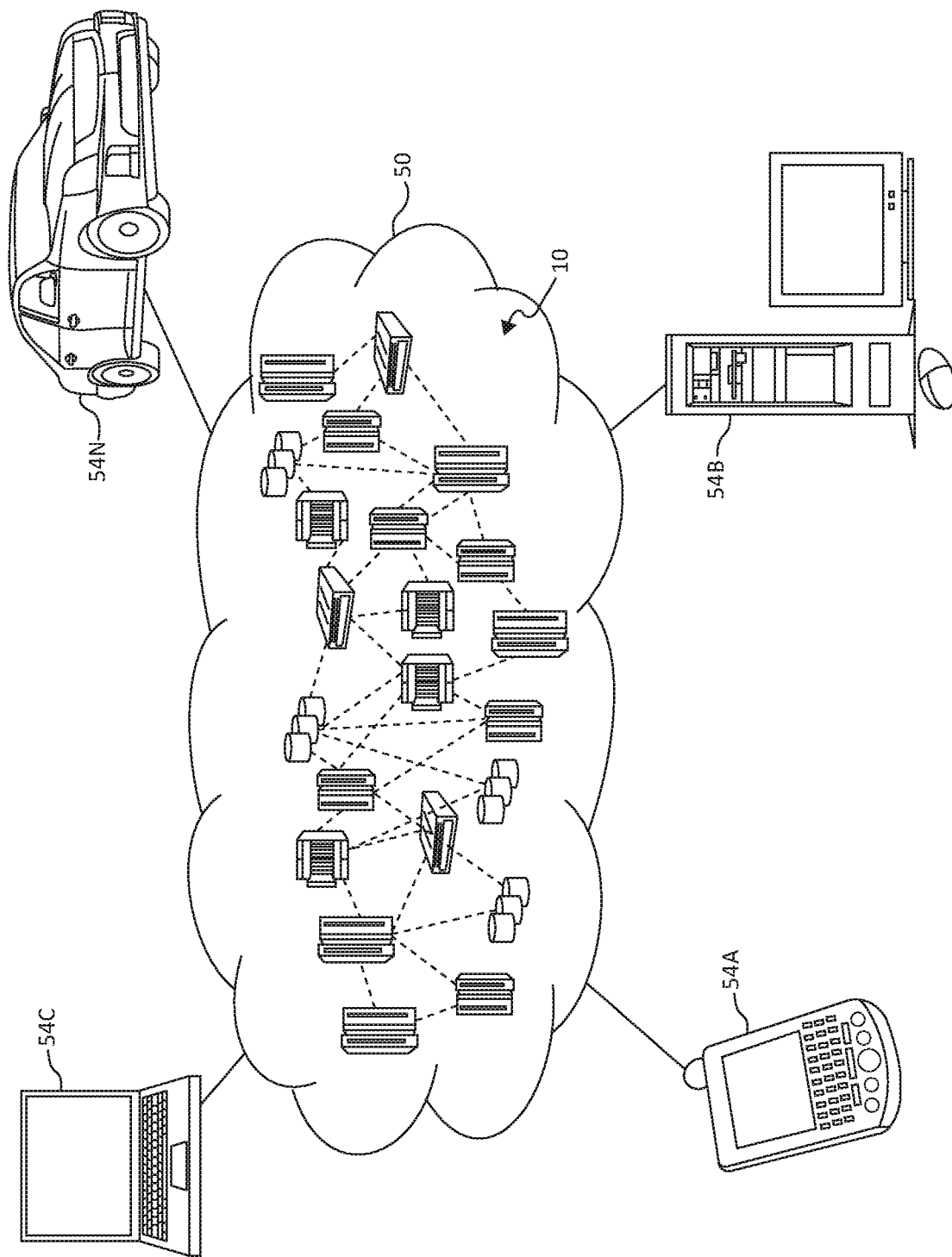
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
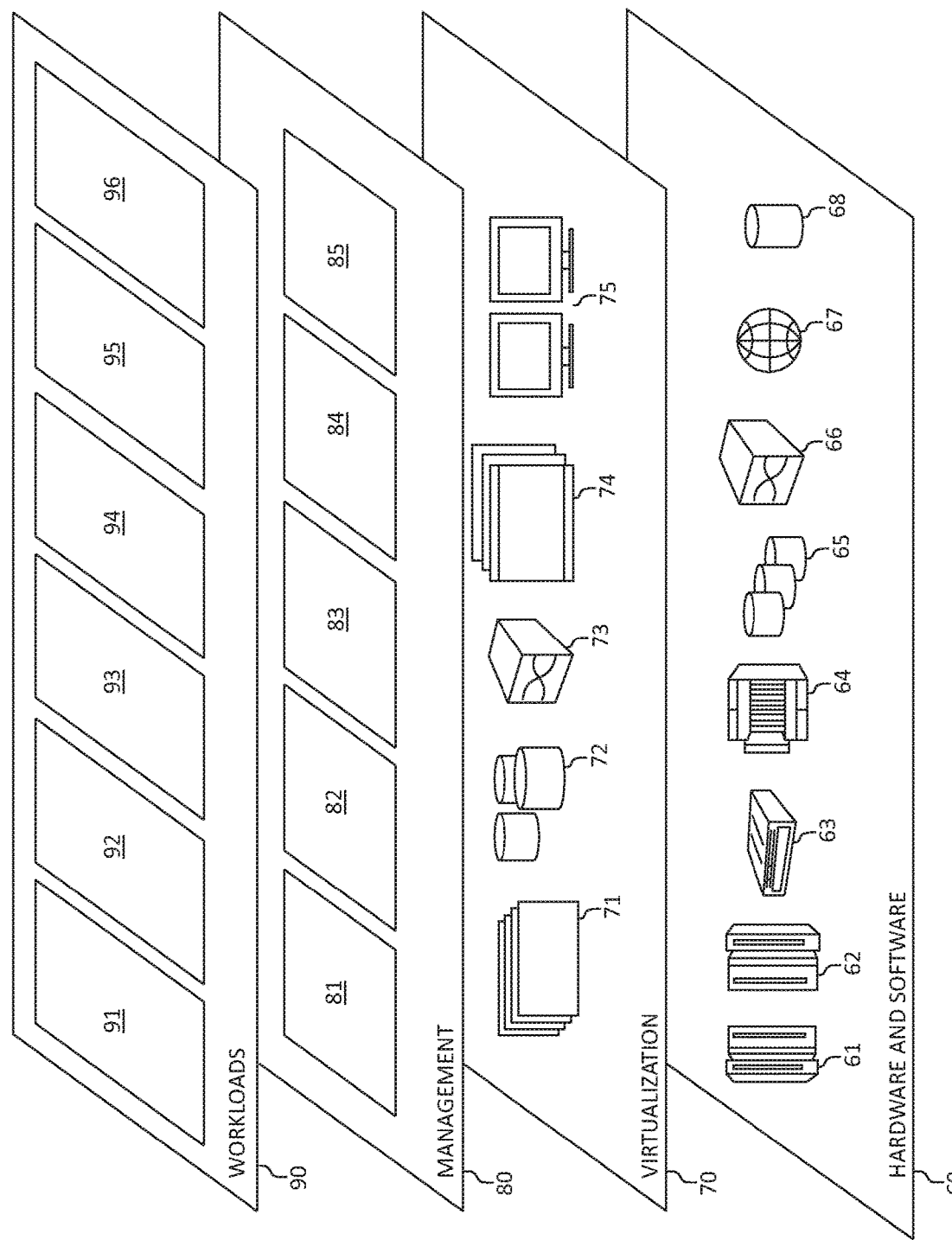
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various targeted learning and recruitment workloads and functions 96. In addition, targeted learning and recruitment workloads and functions 96 may include such operations as user profile analytics, user attribute analysis, and as will be further described, user and device management functions. One of ordinary skill in the art will appreciate that the targeted learning and recruitment workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the improvement of targeted learning and recruitment by, among other aspects, using attributes obtained from a user profile to identify a user as a potential candidate for performing an activity related to either the recruiting or the learning and providing a customized learning experience with targeted course suggestions for the user based, at least in part, on previously recorded data, observations, interactions between hardware components, and/or user profiles.

Figures 4, 5:
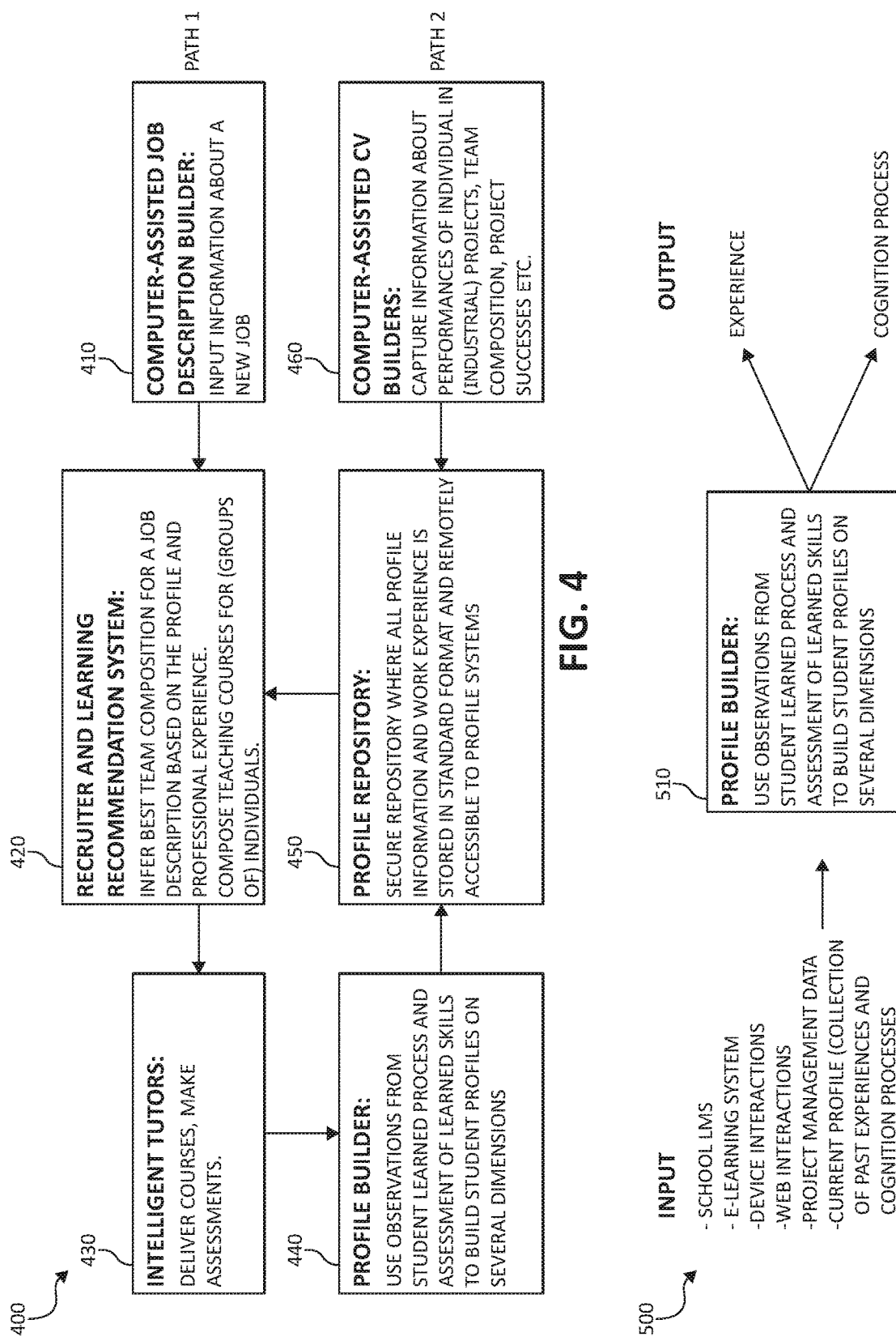
FIG. 4 is an additional flow diagram depicting targeted learning and recruitment in accordance with aspects of the present invention.
FIG. 5 is an additional flow diagram for creating a user profile in which aspects of the present invention may be realized.

Turning now to FIG. 4, a flow diagram 400 depicting targeted learning and recruitment. In one aspect, one or more of the components, modules, services, applications, and/or functions described in FIGS. 1-3 may be used in FIG. 4. For example, computer system/server 12 of FIG. 1, incorporating processing unit 16, may be used to perform various computational, data processing and other functionality in accordance with various aspects of the present invention.

Also, as shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality. With the foregoing in mind, the module blocks 400 may also be incorporated into various hardware and software components of a system for targeted learning and recruitment in accordance with the present invention. Many of the functional blocks 400 may execute as background processes on various components, either in distributed computing components, or on the user device, or elsewhere.

In one aspect, at block 410, input information about a new job, task, or assignment may be defined or entered into a recruiting and learning recommendation service (e.g., using a computer-assisted job description builder via one or more processors). Using a recruiter (e.g., an online/internet based recruiter) and learning recommendation system, a most closely matched team composition (as compared to other team compositions) for a job description based on a user profile and professional experience may be identified or inferred, as in block 420. In one aspect, one or more teaching, training, and/or educational courses may be composed and/or provided for a user or group of users. An intelligent tutor service may deliver the teaching, training, and/or educational courses, as in block 430. A profile builder may be employed to gather and use observations from user (e.g., "student", "candidate", or "employee") learning processes and assessments of learned skills to create and build (e.g., using a profile builder via one or more processors) the shared user profiles based on one or more dimensions, as in block 440. In one aspect, the dimensions may be different sets of information in relation to how a user learns such as, for example, a rate at which a user reads and ingests information, a type of medium a user prefers for study and learning (e.g., physical printouts or electronic mediums), and information as to whether a user learns material with greater efficiency via online material as compared to a human teacher (e.g., a classroom setting with human interaction). A profile repository may be employed, which may be a secure repository (e.g., a profile database repository), where information relating to the attributes, observations, and data of the shared user profiles may be stored. The format for storing the information of the user profile, or shareable user profile itself, may be in a standardized format and may be remotely accessible, as in block 450, using a profile repository controlled by one or more processors. In an additional aspect, a computer-assisted resume or "curriculum vitae" (CV) builder may be used to capture information or data relating to performance of the user, as in block 460. In one aspect, the captured information or data relating to performance may be captured from projects (e.g., industrial or educational projects), competitions (e.g., team competitions), project successes, and the like.

In one aspect, the mechanisms of the illustrated embodiments may provide adaptive learning using a multi-path operation (e.g., path 1 from block 410 and/or path 2 which may be performed concurrently with block 460). Without the adaptive learning, for example, a system would force a presentation of material or teaching strategy selected from a pre-computed list.

In one aspect, the mechanisms of the illustrated embodiments may provide cognitive user profile features or attributes that may assess or evaluate a user according to skills mastering, but also on most effective pedagogy for the user (e.g., student) and hence cognitive characteristics that can be inferred from the pedagogy. Without providing the cognitive profile features or attributes, a system would be only able to assess users on outcome of teaching strategies (degree of skill mastering), and lack the understanding of essential attributes of the user profile to improve the strategy in future courses for that user or other user with a similar profile.

A portable user profile (e.g., a student profile systems) may be provided that may share all or at least a portion of the sharable user profile. In an additional aspect, the mechanisms of the illustrated embodiments may provide a comprehensive and all-inclusive (machine learning) cognitive learning data or attributes of a user profile. That is, all valuable, relevant, and cognitive learning of a user profile information may be captured and stored during the training or education program. This includes information not useful for the primary function of a cognitive trainer or teacher, but which could be of interest to other systems. In this way, all information relevant to a particular system (e.g. teaching, training, or learning) may be captured and stored for later use and retrieval.

In one aspect, the mechanisms of the illustrated embodiments may provide for multi-faceted goals. In one aspect, a learning strategy may be determined that is most relevant and optimal as pertaining to the user, and also determined according to intended purposes of training, teaching, or learning. Feedback from one or more data mining systems may be employed that have access to post "graduation" data (e.g., data related to non-educational institutions following any training or learning) and learn what user profiles best match (e.g., according to a ranking, calculated score, and/or a semantic comparison between attributes of the user profile) various contexts, such as industrial contexts. In one aspect, a calculation of a matching score may include one or more mathematical operations (e.g., using addition, subtraction, division, multiplication, standard deviations, means, averages, statistical modeling using statistical distributions, etc.) that may be used in the measuring, calculating, or analyzing functional operations. In this way, the sharable user profile, not only measures how much the user has mastered the subject, but also the capacity of the user in applying a skill set in a practical application in various environments (e.g., a non-training, non-learning, and/or working environment as compared to a training or learning environment). Furthermore, the shareable user profiles may be linked across one or more various computing systems and applications that may provide feedback.

The present invention may also provide a Knowledge Transfer System (KTS). The KTS system may compare user profiles with that of other users having similar profiles. The KTS system may learn a "best" teaching, training, and/or learning approach (e.g., a most optimal or most advanced teaching, training, and/or learning for each user) by using feedback from one or more cognitive trainers or teachers (e.g., an online training instructor) and using feedback from one or more systems that make use of the user profile. In this way, any hardcoded rules required to select a strategy that works best for a user profile may be eliminated. Also, the KTS system may eliminate the need for any predefined strategy that most closely applies to a particular user profile. Rather, the KTS system may learn and observe from its own evaluation systems while also using feedback provided from different systems.

Turning now to FIG. 5, a flow diagram 500 is depicted for creating a user profile according to various aspects of the present invention. In one aspect, one or more of the components, modules, services, applications, and/or functions described in FIGS. 1-4 may be used in FIG. 5. As shown, the various blocks of functionality 500 are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for targeted learning and recruitment in accordance with the present invention. Many of the functional blocks 500 may execute as background processes on various components, either in distributed computing components, or on the user device, or elsewhere.

Block 510 represents a shareable user profile builder that may use observations from learning processes and may assess learned skills in order to create and build individual, shareable user profiles on several dimensions. In one aspect, one or more input operations may be used by the user profile builder. For example, these inputs may include, but are not limited to, school LMS, e-learning systems, device interactions, internet or web browser interactions, project management data, current user profile data and attributes (e.g., a collection of past experiences and cognitive processes involved in the past experiences). Upon receiving the inputs, the user profile builder may output experience and cognitive processes that may be used to create, build, and/or maintain an updated version of a user's user profile, which may be stored in a shared repository (not depicted for illustrative convenience). The stored user profile may be accessible by one or more recruiters (e.g., an employment recruiter) and/or a learner recommendation system. In one aspect, the experience output may include, but is not limited to, cognitive work or learning data (e.g., "I learned Java in 20 hours with a grade of A"). The cognitive process output may include, but is not limited to, information or data relating to "how" did you gain, learn, and/or acquire a particular learned skill or experience. For example, the cognitive process may include data relating to the "how", such as, for example, "how did you learn Java in 20 hours in order to achieve the grade of A". The cognitive process may then include any data related to the "how" such as, for example, the resources, agents, applications, students, teachers, processes, actions, habits, behavioral data, and/or other information relating to the "how". For example, the cognitive process may include experience and the cognitive processes information relating to the experience, such as, for example the user studied using an e-book, studied each weekday morning at 6:00 a.m., listened to an audio recording, studied three pages per minute, rested every twenty minutes, studied two Wikipedia articles to improve understanding of two concepts, exchanged ideas with user "Y" to perform test "Z". Thus, the experience and the cognitive processes relating to the experience create, build, and maintain the shareable user profile.

With the foregoing functional components 500 in view, consider some of the various aspects of the illustrated embodiments. The mechanisms of the present invention may receive input data of the user from a set of learning and work related systems, such as an LMS, e-Learning, and/or project management system. Learning and work related systems, such as an LMS, e-learning, and/or project management system, may be referred to herein as "learning agents." In one aspect, the learning agents may be independent modules that allow a profile builder to connect to, and extract relevant data from, a formal or informal learning delivery system. Also, current information available in the user profile may also be included as input data, including past experiences and associated cognition processes. A user's interactions with digital devices (e.g., computers, mobile phones, laptops, tablets, smartphone, and the like) may be used as input data to identify the use of learning material (e.g. watching a video of a lesson, or reading a pdf file of a paper) or interactions with other users (e.g. chatting with a colleague on a specific topic). Moreover, a user's interactions with the internet or a web browser, including an internet browsing history and time spent on each web page, may also be used as input data to identify the content of the material being read or viewed (e.g. time spent reading the Wikipedia page of a topic, or test performed on an e-learning platform). Accordingly, as stated above, the user profile builder may use the above input data to generate two outputs for each learning or work experience: 1) the experience description and assessment (e.g., a user learned Java using course X in 20 hours and got A grade), and 2) the cognition process associated to the experience (e.g. the user studied using e-Book X, studied weekday mornings, listened to audio recordings on smartphone in car, studied the pages per minute, rested every twenty minutes, studied two Wikipedia articles to improve understanding of two concepts, exchanges ideas with person "Y" to perform test "Z" and generated a best score or "top score" (as compared to other previously performed test) after reading the material).

Figure 6:
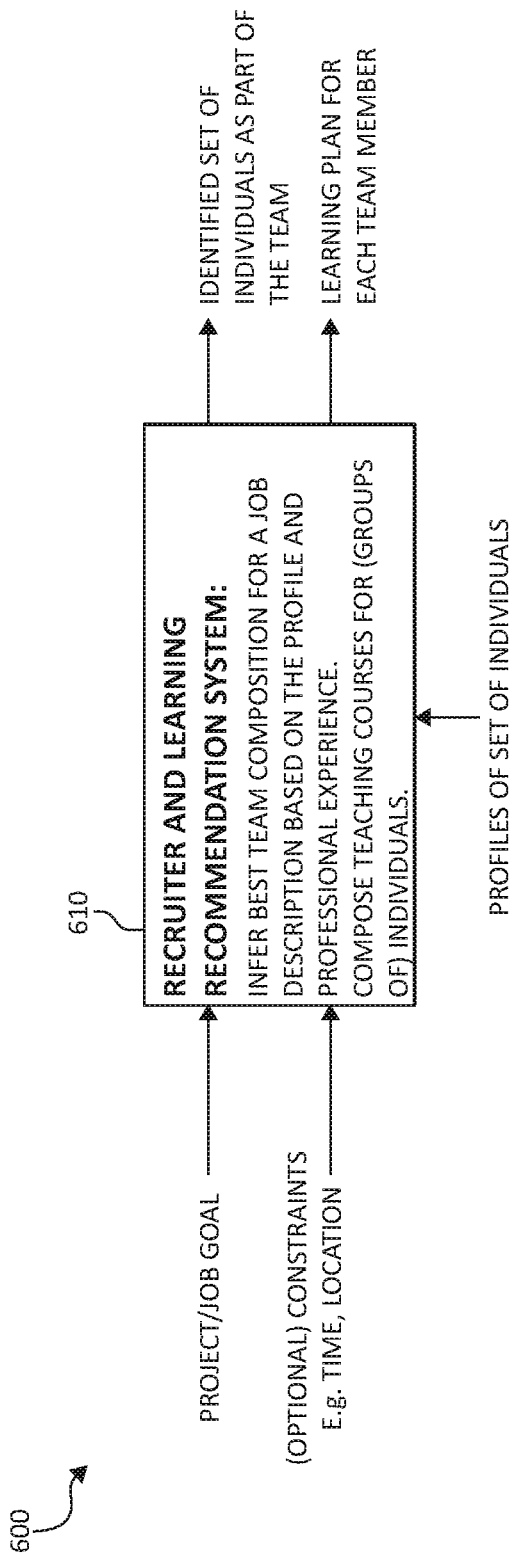
FIG. 6 is an additional flow diagram depicting input/output (I/O) for a recruiter and learning recommendation system in which aspects of the present invention may be realized.

Turning now to FIG. 6, a flow diagram 600 is depicted for receiving input/output (I/O) for a recruiter and learning recommendation system according to various aspects of the present invention. In one aspect, one or more of the components, modules, services, applications, and/or functions described in FIGS. 1-5 may be used in FIG. 6. As shown, the various blocks of functionality are depicted with arrows designating the blocks' 600 relationships with each other and to show process flow. Additionally, descriptive information is also seen relating each of the functional blocks 600. As will be seen, many of the functional blocks 600 may also be considered "modules" of functionality, in the same descriptive sense as has been previously described in FIGS. 4 and 5. With the foregoing in mind, the module blocks may also be incorporated into various hardware and software components of a system for targeted learning and recruitment in accordance with the present invention. Many of the functional blocks 600 may execute as background processes on various components, either in distributed computing components, or on the user device, or elsewhere.

Block 610 represents a recruiter and learning recommendation system that may identify and/or infer a best match or composition (e.g., most qualified or optimal match) relating to a recruiting activity, such as a job description, according to the user profile and professional or learned experience. The recruiter and learning recommendation system may compose one or more teaching, training, or learning courses or programs (e.g., using a LMS, e-learning system, and/or audio/video course) for the user and/or a group of users. That is, the recruiter and learning recommendation system may receive as input data a project or work related goal that may optionally include one or more constraints (e.g., time, location, geography, and the like). The recruiter and learning recommendation system may output, using one or more user profiles, an identified set of individuals as part of a team. That is, one or more users having a user profile that most closely matches the project and/or work related goals with the constraints may be identified as candidates to fulfill the project and/or goal. A learning plan for each team member may be provided.

With the foregoing functional components 600 in view, consider some of the various aspects of the illustrated embodiments. The recruiter and learning recommendation system may receive as input a user profile from a set of users (e.g., pool of job candidates) in addition to constraints related to the user (time, location, etc.), the project or job description including the required skills and constraints. The recruiter and learning recommendation system may compute a score match or "matching score" (e.g., a collaboration level, a skill level, a time compatibility, etc.) between each user or the group of users and the project or job. The recruiter and learning recommendation system may compose and recommend a single user and/or various groups of the users that match the job with respective matching scores taking into account a multi-objective function on different dimensions (e.g. the learning gaps for each group member with respect to the job description). The learning gap may be a desired skill for a particular interest (e.g., a project or goal) that a particular user is missing (e.g., a skill not yet obtained) such as, for example, project management skills, or JavaScript etc. The matching score function may include one or more mathematical operations (e.g., using addition, subtraction, division, multiplication, standard deviations, means, averages, statistical modeling using statistical distributions, etc.) that may be used in the measuring, calculating, or analyzing functional operations. The matching score function may use and take into account the user profile and additional constraints and computes a team (or multiple group) recommendation that maximizes the score function with respect to the job description. For example, the team recommendation may maximize the score function by calculating a combination of scores that provide a highest result with respect to a job description (e.g., a result greater than a selected threshold score for a job description). In one aspect, for each possible group or set of groups, the recruiter and learning recommendation system may compute learning gaps for each group member with respect to their respective user profile. The recruiter and learning recommendation system may recommend a learning plan for each group member to optimize the learning process to achieve the learning goals within a learning time. The learning plan takes into account constraints such as, for example, schedule availability for each group member. The learning plan may include materials, methods of delivery, and steps and a timeline that each individual may optionally and/or be constrained to follow to achieve the group learning goal. The optimized learning plan may also use and take into account the user profiles and maximize a weighted average level (e.g., a calculated weighted average) of expertise of the user's skills within the budget (time, cost) constraint. The optimized learning plan may also minimize the time/cost budget to achieve a set level of expertise. The optimized learning plan may be adaptive in the sense that assignment of skills to the user and the course of the learning process may be adjusted to take into account the progress of the users in achieving their assigned skills, and the interaction of the individuals as a team.

Thus, the mechanisms of the illustrated embodiments provide a targeted recommendation and recruitment system for customized education, training, and task assignment. The targeted recommendation and recruitment system may include a profile builder that may adaptively builds and maintains open, portable and sharable user profiles that contain learned knowledge, learning paths, and cognitive qualities that may be identified or inferred from the learning path (e.g., a most efficient delivery method, a best time of day, rest times, etc.). A recruiting component may identify a best match (or team composition) for an activity, such as, for example, a job, task, and/or course from a pool of prospective candidates utilizing the users' profiles. A learning recommendation component may provide a customized learning experience and course suggestions to a given user or a group of users (including students, teams, etc.) based on their respective user profiles.

In one embodiment, a shareable user profile builder may create and update a user profile of an individual or a set of individuals by 1) accessing a set of learning agents (the agents allow to connect either to the education and career management systems and/or to other formal or informal learning delivery systems), and/or 2) building or updating a learning profile and experiences based on features extracted from observing the interactions between the individuals and the learning agent.

The recruiting component may recommend a match between an individual user (or group of users) and a job position (or a group of positions). In one aspect, the recruiting component may recommend a match between the individual user (or group of users) and the job position by receiving as input the user profile from a set of users in addition to user's constraints (time, location, etc.), the job description including the skills and constraints needed for the position. The recruiting component may recommend the match by computing the score match between a group of individuals and the job required. The recruiting component composes and recommends various groups to match the job with respective scores taking into account a multi-objective function on different dimensions (e.g. the learning gaps for each group member with respect to the job description).

In one aspect, the learning recommendation component may provide to an individual user or group of users a specific learning experience by 1) receiving as input the user profiles from a set of individuals, the learning goals in terms of skills to be achieved as a team or as an individual, one or more other constraints (e.g. an individual learning time availability). The learning recommendation component may provide to an individual user or group of users a specific learning experience by 2) computing learning gaps for each group member with respect to their profile, and/or 3) recommending a learning plan for each group member to optimize the learning process in order to achieve the learning goals within a specific learning time.

Figure 7:
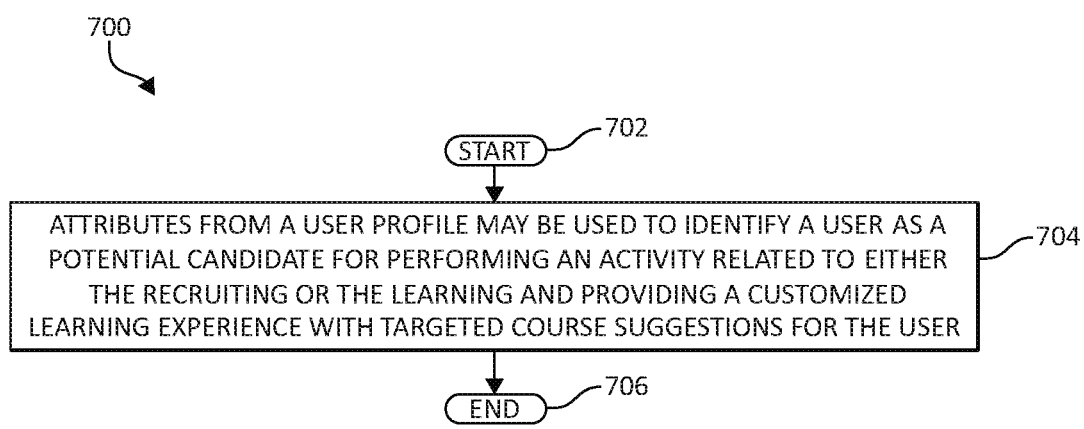
FIG. 7 is an additional flowchart diagram depicting an additional exemplary method for targeted learning and recruitment by a processor, again in which aspects of the present invention may be realized.

Turning now to FIG. 7, a method 700 for targeted learning and recruitment by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The method may start at 702. One or more attributes may be obtained from a user profile and may be used to identify a user as a potential candidate for performing an activity related to either the recruiting or the learning and providing a customized learning experience with targeted course suggestions for the user, as in block 704. The method 700 may end, as in block 706.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for delivering customized educational courses, comprising:
   monitoring, by the processor, user interactions between each of a plurality of users and a plurality of educational applications while being accessed by a respective device associated with each user, wherein the plurality of educational applications uniquely format scores or outcomes indicative of the respective user's performance while interacting with respective ones of the plurality of educational applications;
   creating, by the processor, for each user in a pool of the plurality of users, a sharable user profile having attributes that correspond to learning aspects identified over a duration of use of each educational application according to the monitored user interactions, wherein at least some of the learning aspects are cognitively identified and include at least a rate at which the respective user reads and ingests course material, a type of medium, including electronic and paper mediums, the respective user prefers to read and ingest the course material, and information identifying whether the respective user learns the course material with greater efficiency when the course material is presented with or without human interaction;
   standardizing, by the processor, the learning aspects into a uniform format according to an output of a trained machine learning operation that continuously applies feedback from each of the plurality of educational applications based on the monitored user interactions;
   receiving, by the processor, input data of a project description of a learning activity or a task assignment, wherein the project description includes one or more constraints;
   generating, by the processor, a ranked list of at least some of the plurality of users determined eligible to perform the learning activity or the task assignment by calculating a matching score between each of the plurality of users and the learning activity or the task assignment, using the learning aspects standardized into the uniform format, to rank each of the at least some of the plurality of users eligible to perform the learning activity or the task assignment based on the attributes obtained from each sharable user profile and the project description including the one or more constraints;
   selecting, by the processor, at least one potential candidate from the ranked list, wherein the at least one potential candidate is identified as having a highest ranking comparatively to others of the at least some of the plurality of users in the ranked list; and
   automatically composing, by the processor, a learning plan to accomplish the learning activity or the task assignment by generating targeted course suggestions specific to the at least one potential candidate according to skill gaps identified from a comparison of the project description and the sharable user profile of the at least one potential candidate, wherein the learning plan is dynamically adapted according to the output of the trained machine learning operation based on the continuously applied feedback and is presented to the at least one potential candidate with the learning aspects standardized into the uniform format via a display associated with the processor.

2. The method of claim 1, further including accessing a set of learning agents of each educational application to build and maintain the sharable user profile.

3. The method of claim 2, wherein identifying the learning aspects over the duration of use of each educational application further includes extracting features relating to interactions between the user and the learning agents.

4. A system for delivering customized educational courses, comprising:
   one or more computers, having a processor, with executable instructions that when executed cause the system to:
   monitor, by the processor, user interactions between each of a plurality of users and a plurality of educational applications while being accessed by a respective device associated with each user, wherein the plurality of educational applications uniquely format scores or outcomes indicative of the respective user's performance while interacting with respective ones of the plurality of educational applications;
   create, by the processor, for each user in a pool of the plurality of users, a sharable user profile having attributes that correspond to learning aspects identified over a duration of use of each educational application according to the monitored user interactions, wherein at least some of the learning aspects are cognitively identified and include at least a rate at which the respective user reads and ingests course material, a type of medium, including electronic and paper mediums, the respective user prefers to read and ingest the course material, and information identifying whether the respective user learns the course material with greater efficiency when the course material is presented with or without human interaction;
   standardize, by the processor, the learning aspects into a uniform format according to an output of a trained machine learning operation that continuously applies feedback from each of the plurality of educational applications based on the monitored user interactions;
   receive, by the processor, input data of a project description of a learning activity or a task assignment, wherein the project description includes one or more constraints;
   generate, by the processor, a ranked list of at least some of the plurality of users determined eligible to perform the learning activity or the task assignment by calculating a matching score between each of the plurality of users and the learning activity or the task assignment, using the learning aspects standardized into the uniform format, to rank each of the at least some of the plurality of users eligible to perform the learning activity or the task assignment based on the attributes obtained from each sharable user profile and the project description including the one or more constraints;

select, by the processor, at least one potential candidate from the ranked list, wherein the at least one potential candidate is identified as having a highest ranking comparatively to others of the at least some of the plurality of users in the ranked list; and automatically compose, by the processor, a learning plan to accomplish the learning activity or the task assignment by generating targeted course suggestions specific to the at least one potential candidate according to skill gaps identified from a comparison of the project description and the sharable user profile of the at least one potential candidate, wherein the learning plan is dynamically adapted according to the output of the trained machine learning operation based on the continuously applied feedback and is presented to the at least one potential candidate with the learning aspects standardized into the uniform format via a display associated with the processor.

5. The system of claim 4, wherein the executable instructions access a set of learning agents of each educational application to build and maintain the sharable user profile; wherein identifying the learning aspects over the duration of use of each educational application further includes extracting features relating to interactions between the user and the learning agents.

6. A computer program product for delivering customized educational courses, by a processor, the computer program product comprising a non-transitory computer-readable storage medium having computer-readable program code portions stored therein, the computer-readable program code portions comprising:

an executable portion that monitors, by the processor, user interactions between each of a plurality of users and a plurality of educational applications while being accessed by a respective device associated with each user, wherein the plurality of educational applications uniquely format scores or outcomes indicative of the respective user's performance while interacting with respective ones of the plurality of educational applications;

an executable portion that creates, by the processor, for each user in a pool of the plurality of users, a sharable user profile having attributes that correspond to learning aspects identified over a duration of use of each educational application according to the monitored user interactions, wherein at least some of the learning aspects are cognitively identified and include at least a rate at which the respective user reads and ingests course material, a type of medium, including electronic and paper mediums, the respective user prefers to read and ingest the course material, and information identifying whether the respective user learns the course material with greater efficiency when the course material is presented with or without human interaction;

an executable portion that standardizes, by the processor, the learning aspects into a uniform format according to an output of a trained machine learning operation that continuously applies feedback from each of the plurality of educational applications based on the monitored user interactions;

an executable portion that receives, by the processor, input data of a project description of a learning activity or a task assignment, wherein the project description includes one or more constraints;

an executable portion that generates, by the processor, a ranked list of at least some of the plurality of users determined eligible to perform the learning activity or the task assignment by calculating a matching score between each of the plurality of users and the learning activity or the task assignment, using the learning aspects standardized into the uniform format, to rank each of the at least some of the plurality of users eligible to perform the learning activity or the task assignment based on the attributes obtained from each sharable user profile and the project description including the one or more constraints;

an executable portion that selects, by the processor, at least one potential candidate from the ranked list, wherein the at least one potential candidate is identified as having a highest ranking comparatively to others of the at least some of the plurality of users in the ranked list; and an executable portion that automatically composes, by the processor, a learning plan to accomplish the learning activity or the task assignment by generating targeted course suggestions specific to the at least one potential candidate according to skill gaps identified from a comparison of the project description and the sharable user profile of the at least one potential candidate, wherein the learning plan is dynamically adapted according to the output of the trained machine learning operation based on the continuously applied feedback and is presented to the at least one potential candidate with the learning aspects standardized into the uniform format via a display associated with the processor.

7. The computer program product of claim 6, further including an executable portion that accesses a set of learning agents of each educational application to build and maintain the sharable user profile; wherein identifying the learning aspects over the duration of use of each educational application further includes extracting features relating to interactions between the user and the learning agents.

* * * * *